United States Patent [19]

Komatsu

[11] Patent Number: 5,479,535
[45] Date of Patent: Dec. 26, 1995

[54] METHOD OF EXTRACTING FEATURES OF IMAGE

[75] Inventor: Fumio Komatsu, Fuchu, Japan

[73] Assignee: Kabushiki Kaisha Toshiba, Kawasaki, Japan

[21] Appl. No.: 266,096

[22] Filed: Jun. 27, 1994

Related U.S. Application Data

[63] Continuation of Ser. No. 858,219, Mar. 26, 1992, abandoned.

[30] Foreign Application Priority Data

Mar. 26, 1991 [JP] Japan ..................... 3-086362

[51] Int. Cl.⁶ ..................................... G06K 9/48
[52] U.S. Cl. .................. 382/199; 382/266; 382/270
[58] Field of Search ................ 382/54, 22, 16, 382/27, 25, 199, 201, 266, 270, 190, 205, 203; 358/447, 465

[56] References Cited

U.S. PATENT DOCUMENTS

| | | | |
|---|---|---|---|
| 4,790,027 | 12/1988 | Scherl | 382/22 |
| 5,031,227 | 7/1991 | Raasch | 382/22 |
| 5,034,987 | 7/1991 | Fujimoto et al. | 382/6 |
| 5,073,958 | 12/1991 | Imme | 382/22 |
| 5,136,659 | 8/1992 | Kaneko et al. | 382/25 |
| 5,210,799 | 5/1993 | Rao | 382/22 |

*Primary Examiner*—Yon J. Couso
*Attorney, Agent, or Firm*—Foley & Lardner

[57] ABSTRACT

A method of extracting a feature of an image, includes: a first step of performing a logarithmic conversion process for each pixel of an image taken by an electron microscope to carry out non-linear image enhancement; a second step of performing an N(N is a predetermined value) valued process for each pixel of the image underwent the logarithmic conversion process, threshold values for the N valued process being obtained by dividing the whole range of gray levels of the pixels by N, and gray level of the pixel being one of N constant gray level values by the N valued process; a third step of performing a partial differentiatial process in X- and Y-directions for each pixel of the image obtained by the second step, to make "0" the gray levels of pixels within the same area divided by the N valued process and make only the boundary between different areas divided by the N valued process to have a certain gray level; and a fourth step of detecting the boundary and extracting a feature of said image.

12 Claims, 6 Drawing Sheets

F I G. I

EDGE EXTRACTION $$\left|\frac{\partial P}{\partial x}\right| + \left|\frac{\partial P}{\partial y}\right|$$

METHOD OF EXTRACTING FEATURES OF IMAGE

This application is a continuation of application Ser. No. 07/858,219, filed Mar. 26, 1992, now abandoned.

FIELD OF THE INVENTION

The present invention relates to a method of extracting features of a pattern. More particularly, the present invention relates to a method of extracting features of a pattern, which method is suitable for recognizing or measuring a pattern by using electron beams of a scanning electron microscope (hereinafter abbreviated as SEM) or the like, particularly suitable for evaluation of a pattern with less surface irregularity such as a pattern obtained after a trench forming process among processes of manufacturing very large scale integrated (VLSI) circuits.

BACKGROUND OF THE INVENTION

Conventionally, in recognizing or measuring a pattern using electron beams of an SEM, a low acceleration voltage (1 kV or lower) and low current (10 pA or less) have been used for the SEM in order to reduce radiation damages of a subject or prevent charge-up. Image processing such as a frame accumulation process or filtering process has also been carried out in order to improve an S/N ratio of an image obtained from secondary electron beams of an SEM. A pattern of a processed image obtained by secondary electron beams is automatically measured in accordance with various types of algorithms heretofore proposed (e.g., a threshold value method, a linear approximation method, and a maximum slope method).

The surface of a subject underwent a trench forming process among VLSI manufacturing processes has generally a flat configuration (about 0.1 µm irregularity). In addition, insulation material such as photoresist covers the subject surface. Accordingly, the contrast of an SEM image obtained for searching a pattern is very poor to the extent that a desired pattern location can scarcely be detected. After a desired pattern is once detected, the magnification factor of the SEM is made increased to observe the pattern more finely. With this operation, the dose increases. For this reason, it often becomes impossible to measure a pattern because of increased charge-up while SEM or EOS parameters are adjusted. It is very important to correctly extract pattern features.

Apart from the above, a frame accumulation process is performed in order to improve an S/N ratio of an image to be observed. In this case, an area radiated by electron beams is likely to be contaminated. In view of this, the number of frame accumulations has been limited based on the degree of contamination and charge-up. As a result, not a few cases have occurred wherein an obtained image does not allow automatic measurement of the bottom area, diameter, or the like of a contact hole pattern, for example.

SUMMARY OF THE INVENTION

The present invention has been made in consideration of the above circumstances. It is an object of the present invention to provide effective pattern recognition and measurement by performing various digital processing of a single SEM input image, particularly for subjects likely to undergo charge-up by frame accumulation or for subjects having an even surface and a contrast not sufficient for pattern recognition and measurement.

A logarithmic conversion process at first step performs non-linear emphasis of an image. An N valued process at second step thresholds gray levels of the image. A partial differential process at third step discriminates boundaries between a plurality of gray level areas. In the above manner, features of the image can be extracted.

As described above, the pattern feature extracting method of the present invention, is useful for the case where electron beams of a SEM may damage a subject or may cause charge-up, and where a frame accumulation is not possible and the subject surface has a poor contrast. It is possible to extract necessary pattern features from a single SEM image, allowing various measurements precisely and with high reliability.

DESCRIPTION OF THE PREFERRED EMBODIMENT

A preferred embodiment of the present invention will be described with reference to the accompanying drawings.

Figure 1:
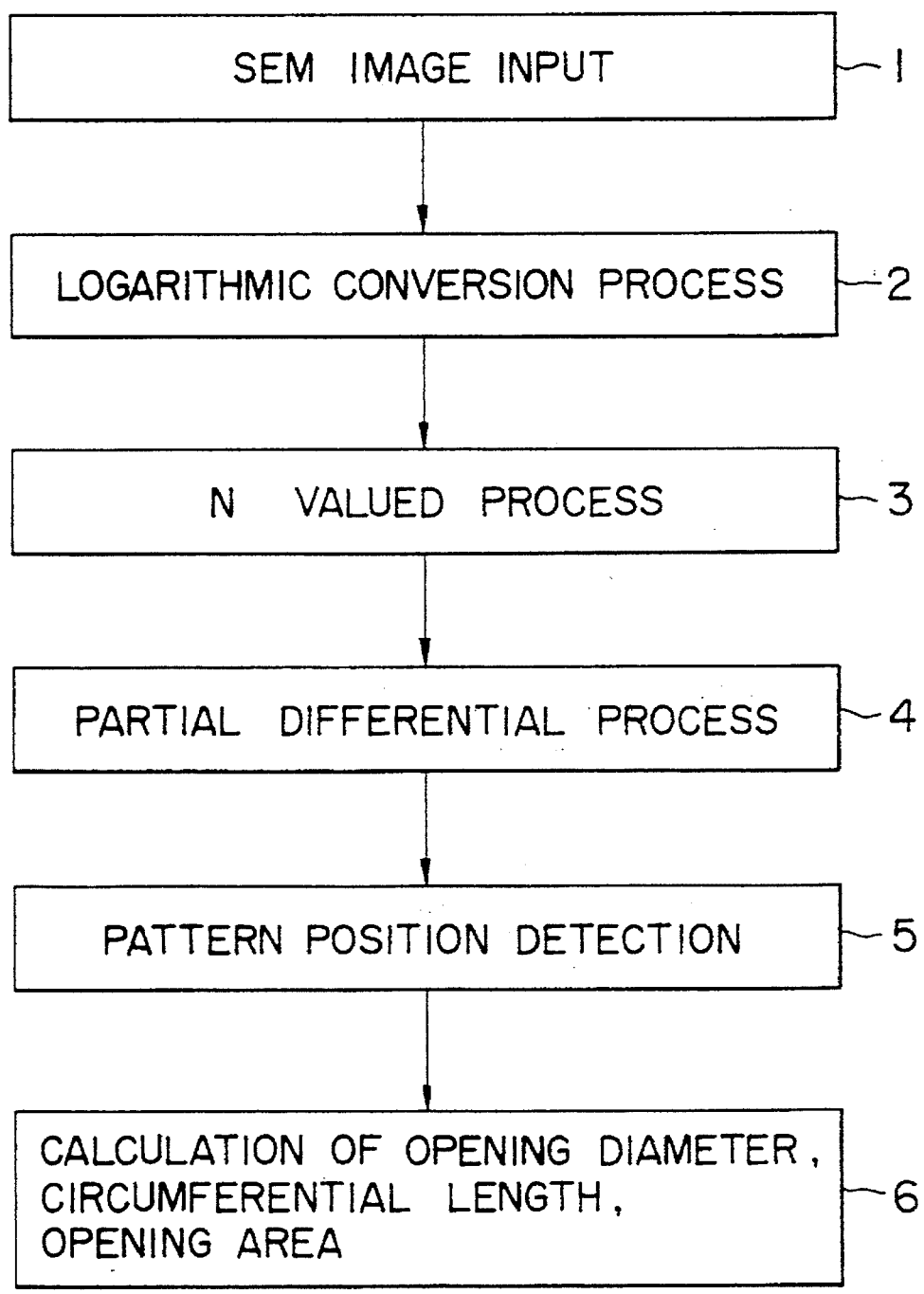
FIG. 1 is a flow chart showing the processes of a pattern feature extracting method according to an embodiment of the present invention.

FIG. 1 is a flow chart showing the image processing procedure of an embodiment of the pattern feature extracting method according to the present invention.

Figure 6:
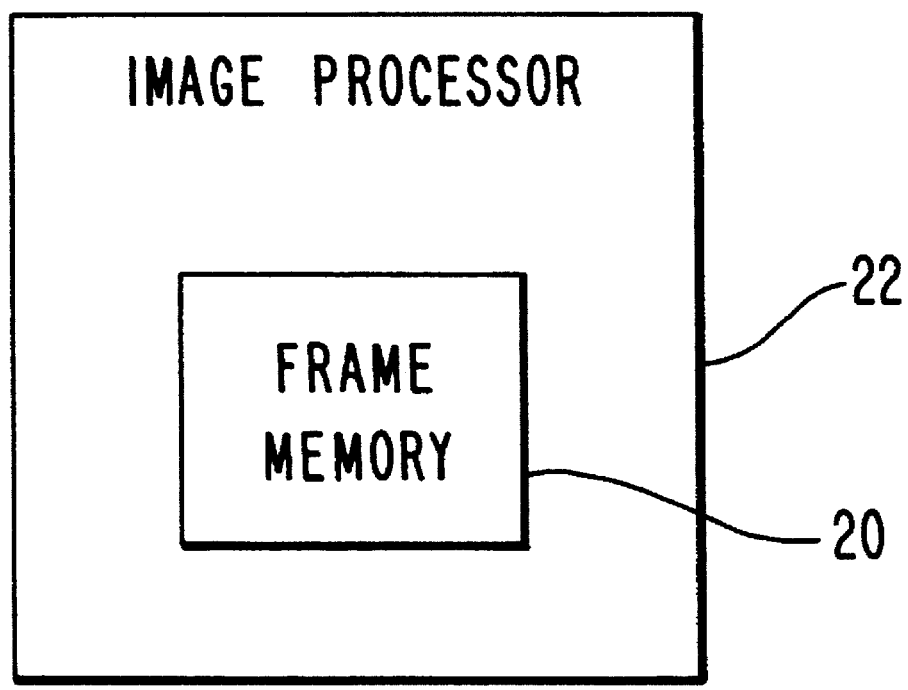
FIG. 6 shows an apparatus for extracting a desired feature of an image according to the invention.

At first step 1, an image (not shown) observed by an SEM is inputted to a frame memory 20 of an image processor 22 as an original image by suing the apparatus of FIG. 6.

At second step 2, a (common) logarithmic conversion process is performed for each pixel of the stored original image. Namely, F'(X, Y) is obtained for each gray level F(X, Y) of a pixel at the coordinates (X, Y) by the following equation, and stored in the frame memory.

$$F'(X, Y) = 255 \, (\log F(X, Y) - \log F_{min}) / (\log F_{max} - \log F_{min}) \quad (1)$$

At third step 3, an N valued process is performed for each pixel of the image underwent the logarithmic conversion process. For example, in order to separate an image into a substrate surface, a taper area, and a pattern bottom area, a ternary value process is performed. The threshold values for the ternary value process are obtained by equally dividing the whole range of gray levels (in this case, 0 to 255) into three groups. Since the gray levels have been normalized by the preceding logarithmic conversion process, even the equal division into three groups can separate the image sufficiently. The ternary gray levels, for example, "40", "126", and "212", are stored in the frame memory.

At fourth step 4, a partial differential process is performed sequentially for pixels both in X- and Y-directions. Since the N(=3) valued process was performed at the preceding step, the image data underwent the partial differential process contains only N-1 (=2) boundaries which can be detectable. Pixels within each N valued area have a value 0 because of the partial differential, the gray level 0 of each pixel being stored in the frame memory. For the ternary gray levels described above, the boundary has a gray level "86".

At fifth step 5, the image processor searches pixel locations of the above-processes image, which pixel locations have a certain gray level (in this example, "86") and a consecutive address on the frame memory, to thus detect the location of a pattern. In the case of a hole pattern, for example, the pixel locations having the certain gray level correspond to the upper edge and bottom edge of the hole.

At sixth step 6, the diameter (upper edge diameter) and circumferential length of the hole are obtained, by counting pixel addresses of the detected locations in X- and Y-direction and multiplying the number of pixels by a dimension of one pixel. The area of the hole is obtained by counting the number of all pixels within the detected locations and multiplying the count by an area of one pixel.

With the above-described image processing steps, it is possible to calculate the upper edge diameter, circumferential length, and opening area of the hole, by using the original SEM image.

FIGS. 2 to 5 show images obtained from an image of a subject taken by a SEM and processed in the manner explained in the flow chart shown in FIG. 1. The subject used herein had a trench pattern with an opening diameter of 1.08 μm, the acceleration voltage of an SEM was set to 1.2 kV, and the magnification factor was set to X40k.

Figure 2:
FIGS. 2 is a photograph taken by an SEM and inputted to an image processor as an original SEM image.
Figure 3:
FIG. 3 shows an image obtained from the original image through a logarithmic conversion process.
Figure 4:
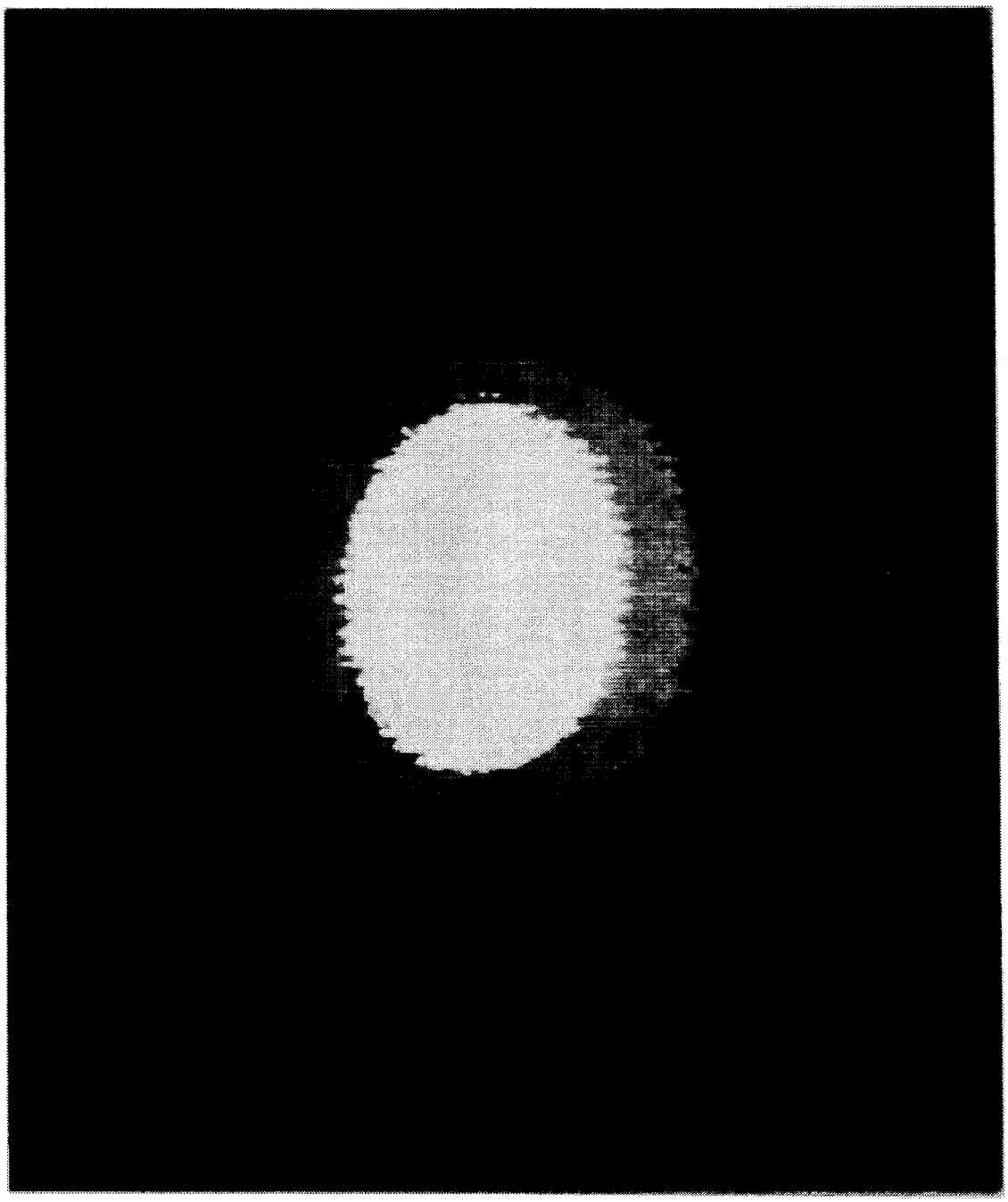
FIG. 4 shows an image obtained from the image shown in FIG. 3 through a ternary value process.
Figure 5:
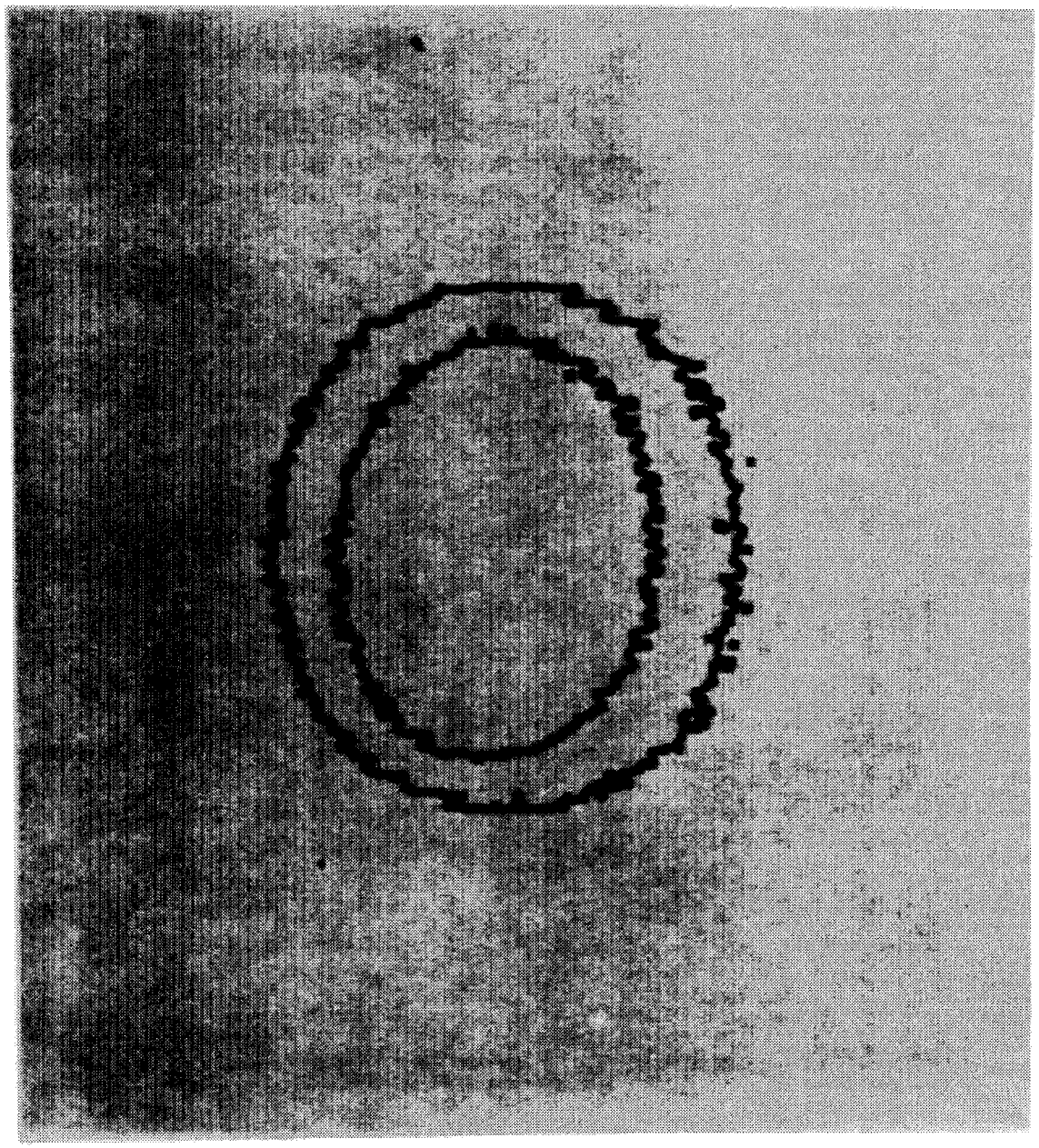
FIG. 5 shows an image obtained from the image shown in FIG. 4 through a partial differential process.

FIG. 2 shows an SEM image inputted to the image processor. The sampling speed was set to 3.84 μsec/pix., and no frame accumulation was performed. FIG. 3 shows an image obtained from the original image through a logarithmic conversion process, i.e., through non-linear contrast enhancement of the original image. FIG. 4 shows an image obtained from the image underwent the logarithmic conversion process, through a ternary value process. It is possible to definitely discriminate between the substrate surface of the subject, and the taper area and bottom of the trench pattern. FIG. 5 shows an image obtained from the ternary value image, through a partial differential process in both X- and Y-directions. It is possible to provide a contour representation of the boundaries of the respective areas.

Using the final pattern shown in FIG. 5 obtained by the above-described steps, the image processor calculated the number of pixels constituting the contour loops. The calculation results showed that the opening diameter of the trench pattern was 1.16 μm, the trench bottom diameter was 0.92 μm, and the trench bottom area was 2.13 μm². It is possible to easily detect the pattern location of an original image having a poor S/N ratio, by superposing the original image upon the image obtained through the partial differential process.

What is claimed is:

1. A method for extracting a desired feature of an image generated by an electron microscope, comprising the computer implemented steps of:

a) inputting in a processor having a CPU and a frame memory said image generated by said electron microscope;

b) storing pixels of said image in said frame memory;

c) converting, in a logarithmic manner, each of said pixels using said CPU and creating non-linear image enhancement pixels;

d) assigning each of said non-linear image enhancement pixels to one of N different groups each having a corresponding pixel value and converting said non-linear image enhancement pixels into valued process pixels, each of said valued process pixels in said different groups having said corresponding pixel value;

e) partially differentiating said valued process pixels in X- and Y-directions using said CPU and creating partially differentiated pixels; and f) determining said desired feature of said image by detecting a boundary from said partially differentiated pixels.

2. A method according to claim 1, further comprising a step of detecting a pattern shape and a pattern size of said image by detecting partially differentiated pixels having equivalent magnitudes.

3. A method according to claim 1, wherein said CPU performs the conversion in step c) according to the following equation:

$$F'(X, Y) = CNmax(\log F(X, Y) - \log Fmin)/(\log Fmax - \log Fmin)$$

where F(X, Y) represents a gray level of a pixel at coordinates (X, Y), Fmax represents a maximum gray level, Fmin represents a minimum gray level, CNmax is a constant value, F'(X, Y) represents a gray level of a non-linear image enhancement pixel at the coordinates (X, Y) obtained in said step c).

4. A method according to claim 2, wherein said CPU performs the conversion in step c) according to the following equation:

$$F'(X, Y) = CNmax(\log F(X, Y) - \log Fmin)/(\log Fmax - \log Fmin)$$

where F(X, Y) represents a gray level of a pixel at coordinates (X, Y), Fmax represents a maximum gray level, CNmax is a constant value, Fmin represents a minimum gray level, F'(X, Y) represents a gray level of a non-linear image enhancement pixel at the coordinates (X, Y) obtained in said step c).

5. A method according to claim 1, wherein said step d) includes dividing said non-linear image enhancement pixels into N number of gray level groups.

6. A method according to claim 2, wherein said step d) includes dividing said non-linear image enhancement pixels into N number of gray level groups.

7. A method of claim 1, wherein said image is generated by a single scan of an electron microscope.

8. A method according to claim 1, wherein said step e) includes making said valued process pixels within a same area equal to a first gray level value.

9. A method according to claim 5, wherein said step d) includes assigning each of the non-linear image enhancement pixels to a gray level value representing one of the N number of gray level groups.

10. A method according to claim 8, wherein said step d) includes making valued processing pixels on a boundary between areas equal to a second gray level value.

11. A method for extracting a desired feature of an image generated by an electron microscope, comprising the computer implemented steps of:

inputting in a processor having a CPU and a frame memory said image generated by said electron microscope;

storing electronic pixel signals of said image in said frame memory;

converting, in a logarithmic manner, each of said electronic pixels signals using said CPU and creating non-linear image enhancement pixel signals;

processing each of said non-linear image enhancement pixel signals using said CPU and creating N types of (N is a predetermined number valued process pixel signals;

partially differentiating said N types of valued process pixel signals using said CPU in X- and Y- directions and creating partially differentiated pixel signals; and generating said desired feature of said image by detecting a boundary from said partially differentiated pixel signals.

12. An apparatus for extracting a desired feature of an image generated by an electron microscope, comprising:

an image processor having a CPU and a frame memory for receiving said image generated by said electron microscope, said frame memory storing electronic pixel signals of said image and said CPU converting, in a logarithmic manner, each of said electronic pixels signals stored in said frame memory and creating non-linear image enhancement pixel signals, wherein said image processor further processes each of said non-linear image enhancement pixel signals and creates N types of (N is a predetermined number valued process pixel signals, partially differentiates said N types of valued process pixel signals in X- and Y- directions and creates partially differentiated pixel signals, and determines said desired feature of said image by detecting a boundary from said partially differentiated pixel signals.

* * * * *